B. M. NYCE.

Refrigerating and Preserving House.

No. 1,068.

Reissued Oct. 23, 1860.

N. PETERS. Photo-Lithographer, Washington, D. C.

UNITED STATES PATENT OFFICE.

BENJAMIN M. NYCE, OF KINGSTON, INDIANA.

IMPROVED REFRIGERATOR.

Specification forming part of Letters Patent No. 21,977, dated November 2, 1858; Reissue No. 1,068, dated October 23, 1860.

*To all whom it may concern:*

Be it known that I, BENJAMIN M. NYCE, of Kingston, in the county of Decatur and State of Indiana, have invented a new and Improved Preserving-Chamber; and I do hereby declare the following to be a full, clear, and exact description thereof, reference being had to the annexed drawings, making a part of this specification.

The said invention relates to a provision for preserving fruits and other perishable substances; and it consists of a room or apartment guarded externally by non-conducting walls, and provided at its upper part with an insulated ice-reservoir and within its interior with a means of mechanical agitation of the contained air, and with deposits of quicklime or other absorbents.

Figure 2:
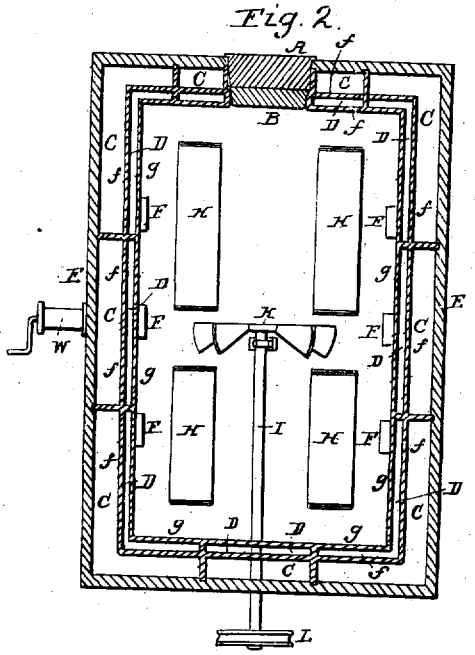
Figure 1:
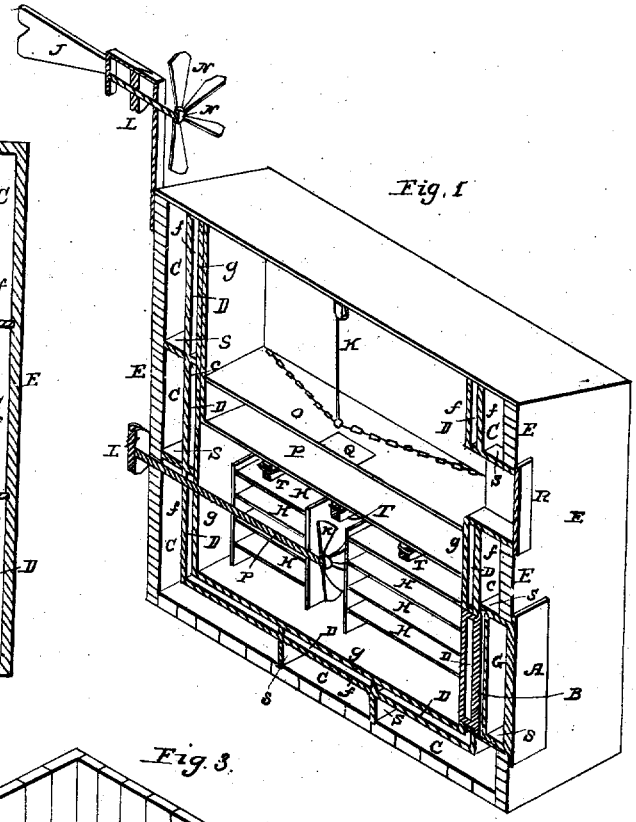
Figure 3:
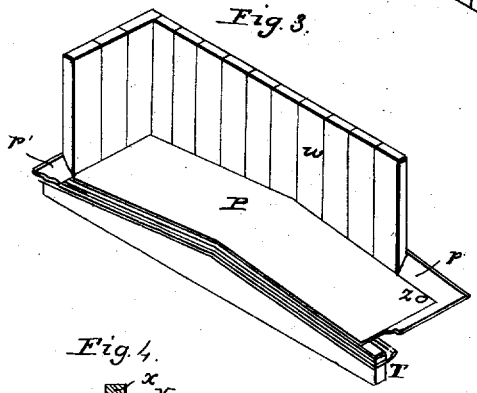
Figure 4:
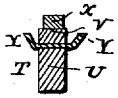

Figure 1 shows by vertical section and in perspective a room or chamber embodying my improvements. Fig. 2 is a horizontal section below the ice floor. Fig. 3 is a perspective view of a portion of the ice-reservoir, together with one of its supporting-beams. Fig. 4 is a transverse section of a supporting-beam.

The preserving-chamber J should be made as nearly air and heat tight as possible, and to this end its walls and floor may be constructed as follows:

E, *f*, and *g* constitute, respectively, an outer, an intermediate, and an inner air-tight shell or casing. Septums S, extending from shell to shell, form cells or compartments C D, of which the outer series of cells, C, may be filled with chaff or other good non-conductor, while the inner series of cells may be occupied by dead-air. The ice-floor P is constructed of sheet metal, so as, while effectually preventing any actual contact of ice with the air of the preserving-chamber J, to at the same time afford a free and equal conduction of heat through every portion of the floor. The upper surface of the ice-floor P has a slight descent toward one or more discharge-pipes, Z.

*p'* is a rim supporting an inner wall, *w*. The ice-floor P is supported on transverse beams T, having their upper portion, *x*, metallic, in order that there may be a free and rapid conduction of heat from the preserving-chamber through those parts of the floor in contact with the beams. The lower portion, *u v*, of the beams may be of wood.

*y* is a metallic trough to receive and conduct off condensed vapor.

O is a movable air-tight cover, which is made to fit snugly the sides of the ice-reservoir, so as to insulate its lower portion, containing ice, from its upper portion, which, after placing of the ice-cover O, is packed with chaff or other non-conductor. The insulation of the two compartments of the ice-reservoir may be completed by the application of tarred canvas or other luting to the edges of the cover O. The elevation of the cover O for the insertion of ice may be effected by means of a windlass, W, and cord *k* or other suitable appliances.

R is a door leading into the ice-reservoir.

Q is a trap-door in the cover O.

The entrance-passage to the preserving-apartment should be guarded by a series of doors, so that an entrance to or exit from the room can be effected without direct communication between the inner and the outer air. These doors should be made double, and be packed with chaff or other non-conductor, and should be made to fit their frames closely by means of list or otherwise.

H are shelves for the reception of fruit or other edibles.

K is a rotary fan operated by means of a wind-wheel, N. Receptacles F, for quicklime or other suitable desiccating and antiseptic substance, act in conjunction with the agitator K to absorb gaseous impurities and surplus moisture from every portion of the contained air.

I do not propose to confine myself to the precise arrangement herein described of insulating devices, as many others may obviously be substituted without deviating from the essential characteristics of my invention; nor do I propose to confine myself to the particular form of agitator described, it being manifest that various means of forced circulation, operated by wind or other power, may be employed.

The following is what I claim as new and of my invention herein:

1. The insulated and cooled preserving-chamber J, provided with an atmospheric agitator, K, and absorbent F, operating substantially as and for the purposes set forth.

2. The construction of the beam T, having a metallic upper portion, *x*, and a water-collecting trough, *y*, substantially as and for the purposes explained.

3. The insulating-cover O of the ice-reservoir, arranged and applied substantially as and for the purposes set forth.

In testimony of which invention I hereunto set my hand.

BENJN. M. NYCE.

Witnesses:
GEO. H. KNIGHT,
FRANCIS MILLWARD.